United States Patent Office 3,394,803
Patented July 30, 1968

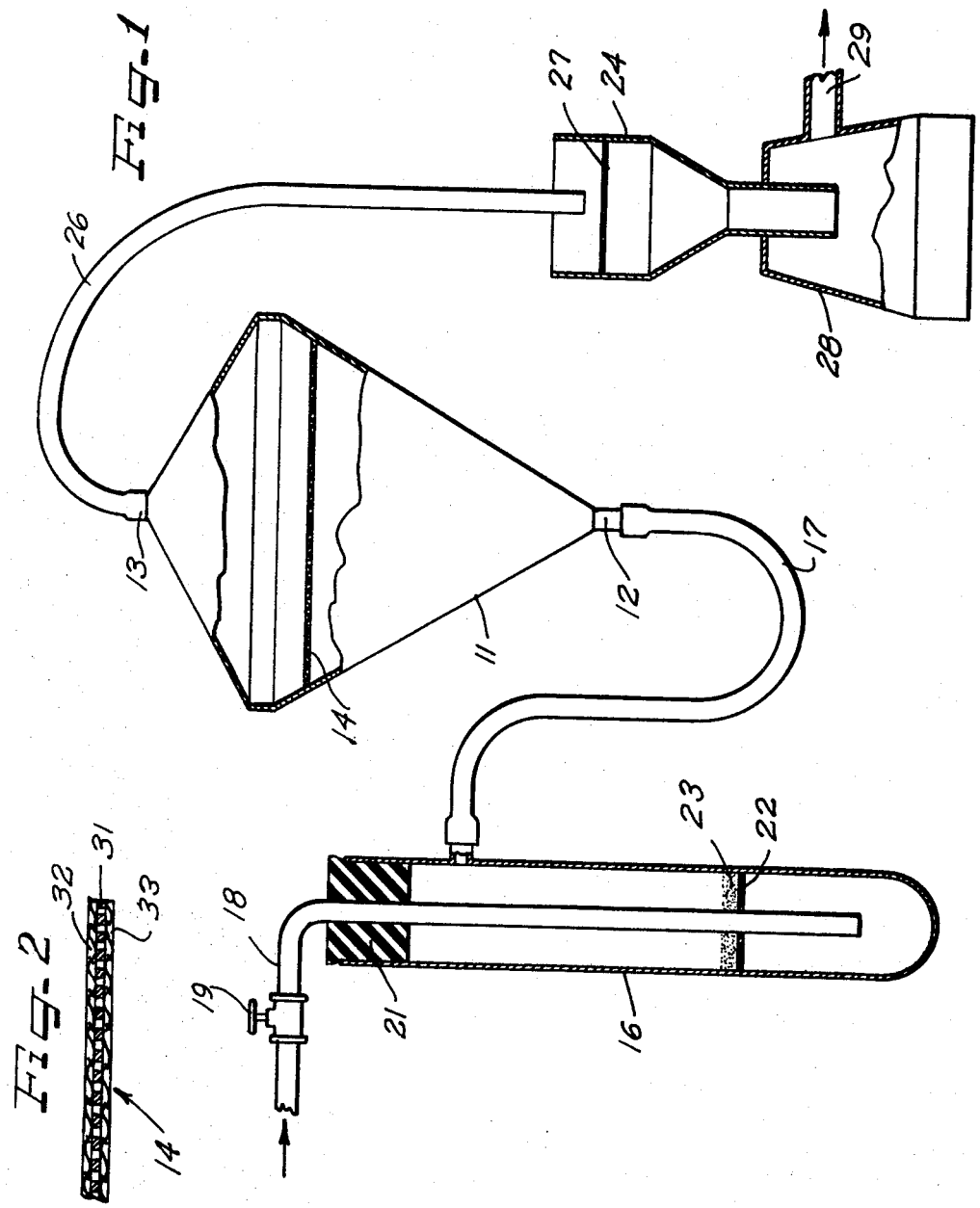

3,394,803
METHOD AND APPARATUS FOR FRACTIONATION OF FINE PARTICLES
Brian Howard Kaye, Hickory Hills, Ill., assignor to IIT Research Institute, Chicago, Ill., a corporation of Illinois
Filed Feb. 23, 1966, Ser. No. 529,388
5 Claims. (Cl. 209—17)

ABSTRACT OF THE DISCLOSURE

Method and apparatus for the fractionation of particles into fractions above and below a predetermined size wherein the mixture of particles is suspended in a fluid stream under flow conditions such that the smaller particles are separated from the larger particles by elutriation, and then the mass flow velocity of the entire stream is increased to thereby cause the suspended particles to be passed through a screen having openings of the predetermined size mentioned above, whereby the smaller particles pass through the screen and the larger particles are retained behind the screen, permitting recovery of both the smaller particle fraction and the larger particle fraction.

---

This invention relates to a method and apparatus for fractionation of particles.

In the past, the separation of particles of different sizes has been accomplished by delivering a random mixture of the particles to a sieve having apertures of a size which would enable the fine particles to pass through the sieve but would prevent passage of the larger particles. Passage of particles in this arrangement is slow due to interlocking of adjacent particles and high interparticle friction. This arrangement is especially slow in the final stages of a multi-stage process since the particles which are capable of passing through the sieve are dispersed randomly throughout the mass of larger particles. The probability of many of the smaller particles reaching the sieve surface during a sieving operation is quite low. Furthermore, sieves having very fine mesh are operating on particles which have very small mass and the increased surface forces present make it increasingly difficult for the particles to pass through the sieve.

Elutriation is a process for separating particles suspended in a moving fluid. The force tending to make the particles flow with the fluid is viscous drag, and the mass of the particle is operated on gravitational or centrifugal forces. The critical size for fractionating purposes is that size which just moves with the fluid out of the separation chamber. Larger particles remain behind. The simple theory of elutriation assumes ideal flow conditions which are not achieved in practice and so the theoretically desired fractionation is never achieved.

The present separation process involves subjecting the particles to be separated to a fluid moving in such a way that lighter particles are carried along by entrainment forces acting thereon from the fluid. Preferably the fluid flows in an upward direction toward the underside of a filter having an aperture size just sufficient to pass one fraction of the particles while positively rejecting particles exceeding the critical size for the fractionation process. Preferably the flow rate is initially at a relatively low value so that lighter particles essentially all of which are below the critical size are carried to the filter first, after which the flow rate is progressively increased so that progresively larger particles are carried to the filter.

In a preferred apparatus for practicing the invention, water is utilized to move the particles upwardly in a chamber having the filter or sieve therein. Initially the relatively fine particles essentially all of which are below the critical size enter the region below the filter, and move upwardly through the filter and then out the top section of the chamber. The filter has a predetermined aperture size essentially equal to the critical size of the fraction which is to be collected from the top section of the chamber. Means is provided for increasing the flow rate of the water to carry progressively larger particles into the region below the filter until the relatively heavy particles exceeding the aperture size block the undersurface of the filter, at which point the mass flow velocity of the water may be reduced to zero by the operator or by an automatic control. This point is readily apparent by the clearness of the water immediately above and beyond the filter. Once the flow rate of the water has been reduced to zero, the entire chamber may be inverted so that the larger particles move against the filter under the force of gravity and remain on the filter for easy removal.

According to the present invention, therefore, the advantage of using a fine mesh filter or sieve, namely the positive segregation of extremely fine particles, is combined with the inherent advantages of an elutriation process to provide an extremely efficient separation process.

The chamber below the filter is preferably of a configuration to produce turbulent flow within the chamber and thus to facilitate separation of agglomerated particles before reaching the filter; a progressively increasing cross sectional area for the lower part of the chamber enables the particles to be spread away from each other to thereby prevent further agglomeration and reduce interparticle friction.

It is therefore an important object of the present invention to provide an improved apparatus and method for fractionating mixtures of particles of different size.

It is another object of the present invention to provide an apparatus and method capable of more efficiently and accurately segregating relatively fine particles with a critical size of the order of one to fifty microns from particles exceeding such critical size.

Still another object of the present invention is to provide an apparatus and method for filtering particles which utilizes a filter with apertures of critical size interposed in a relatively free flowing stream with little agglomeration of particles at the filter and wherein the tendency of particles larger than the critical size to block the passage of the finer particles through the filter is largely avoided.

Yet another object of the present invention is to provide an apparatus and method for fractionating fine particles which utilizes a turbulent flow of fluid to break up agglomerated particles.

Other objects, features and advantages of the present invention will be apparent from the following detailed description taken in connection with the accompanying drawings in which:

FIG. 1 is a diagrammatic illustration of an elutriation system in accordance with the principles of the present invention; and FIG. 2 is an enlarged view of a filter for the elutriation system of FIG. 1.

In a preferred elutriation system in accordance with the invention, water under pressure conveys particles by entrainment forces from a predispersion unit into a flexible tube and thence into a container having a conically shaped lower wall. The pressure is controlled by a manually adjustable valve so that the pressure on the water can be progressively increased to entrain progressively heavier particles for greater distances. The particles, of small enough diameter, pass through a filter and thence continue on upwardly to the top portion of the chamber. These small particles are then removed via a flexible tube to a collecting container. The particles continue to move upwardly until the larger particles which have become entrained in the water move upwardly toward the filter. When the particles having a size just equal to that of the apertures in the filter come to the filter the pressure of the water is reduced to zero. This point is readily apparent, because the water above the filter is then substantially clear since at this stage very few particles can pass through the screen while some water can still work its way through.

Thereafter, the container may be inverted so that the trapped large particles may then rest upon the filter (the filter having relatively small apertures which prevent the larger particles from passing therethrough). As a result, the larger particles can be easily and efficiently removed.

Referring to the elutriation apparatus of FIG. 1, there is illustrated a generally conically-shaped container 11 having an inlet port 12 located at the apex of the container 11 and an output port 13 at the top portion of the container 11. A filter 14 is mounted within the chamber defined by the walls of the conical container 11. The port 12 is coupled to a predispersion unit 16 via a flexible tube 17.

The predispersion unit 16 has a tube 18 for enabling water under pressure to enter the unit and to pass downwardly therethrough. The tube 18 is connected to a manually adjustable valve 19 which controls the rate of flow of water from a pressurized water reservoir, not shown in the drawings. The tube 18 is securely held in position by means of a stopper 21. The water enters the tube 18 and flows downwardly through the tube 18 until the water reaches the bottom portion of the unit 16. The water then accumulates at the bottom of the unit and begins to rise and passes through a coarse wire screen 22, which is mounted within the chamber defined by the unit 16. The mixture 23 of light and heavy particles to be separated rests on the top surface of the screen 22. As the water passes through the screen 22 it carries particles from the mixture 23 upwardly within the chamber, formed by the unit 16, by means of entrainment forces. The lighter particles of the mixture 23 are then carried through the flexible tubing 17 and thence into the bottom or apex of the conical chamber 11, so that at least partial elutriation occurs before the particle suspension enters the chamber 11.

At first, small light particles are entrained by the water and move from the predispersion unit 16 through the tube 17 and thence into the container 11. These fine particles move upwardly through the apertures of the filter 14 and thence through the top portion 13 of the container 11. The rate of water flow is gradually increased by means of the valve 19 to thereby entrain increasingly larger and heavier particles. The increasingly larger particles are still small enough to pass through the apertures of the filter 14, until a critical velocity of the water is reached. This critical velocity is the velocity of the water at which particles having the same size as the apertures of the filter 14 just reach the filter 14. As these particles reach the filter 14, the flow of the water is then reduced to zero by closing the valve 19. The point at which these heavy larger particles just reach the filter 14 is readily apparent from the clearness of the liquid stream leaving the filter and moving upwardly to the port 13. When substantially all of the particles of sub-critical size have passed through the screen, and the critical sized particles start to block the screen, some water will still be forced through the screen and appear as a clear stratum immediately above the screen. This critical water velocity can also be detected by means of a photoelectric monitor responsive to the clarity of the filtrate, which can be utilized to turn off the water at the completion of the process. As a result, separation of the particles is more precise and accurate than with conventional elutriation apparatus.

During an elutriation process, particles may become agglomerated causing them to be trapped by the filter. The flexible tube 17 may be compressed to prevent any further flow of water into the container 11, thereby causing these agglomerated particles to fall downwardly away from the filter 14. Thereafter, the tube 17 can be released to resume the flow of water and to subject the agglomerated particles to turbulent flow conditions; this action tends to separate the agglomerated particles so that the smaller particles may be carried upwardly through the apertures of the filter 14.

After particles having a size which is equal to the size of the apertures of the filter 14 have reached the filter and the mass flow velocity of the water has been reduced to zero, the container 11 may be inverted so that the larger heavy particles in the container 11 are trapped on the top surface (formerly the undersurface) of the filter 14. Of course the large particles may be removed from the container 11 in any other convenient manner.

The fine light particles which pass through the apertures of the filter 14 move upwardly through the port 13 of the container 11 and thence are directed to a container 24 by means of a flexible tube 26. The small particles collect on a membrane filter 27, the membrane filter having extremely fine pores which prevent the fine particles from passing therethrough. The water, however, passes from the tube 26 through the membrane filter 27 and thence into a subchamber 28 below the container 24. This water is then drawn upwardly through a port 29 which is connected to a source of vacuum or negative pressure not illustrated in the drawings. The water may then be recirculated to the valve 19.

Referring now to FIG. 2 an enlarged view of the filter 14 is illustrated. The filter 14 comprises a fine mesh sieve 31 having a plurality of extremely small apertures. The sieve 31 is supported above and below by wovenwire sieve cloths 32 and 33 repectively, which provide structural strength for the fine mesh sieve 31.

The sieve 31 is preferably an electro-formed sieve with apertures in the range of one to fifty microns. For example, an aperture size of 18 microns may be employed. The wire sieve cloths 32 and 33 may have aperture sizes of 325 mesh (44 microns). Coarser sieves may be used at 32 and 33. The size of apertures in sieve 31 is determined by the critical size for the fractionation process.

A suitable dispersing agent, such as "Calgon" (a sodium polyphosphate) which is commonly known in the trade, may be added to the water to further aid in preventing agglomeration of the particles.

The elutriation method and apparatus in accordance with the principles of the present invention is not limited to low Reynolds numbers as in conventional elutriation processes, and therefore precise mathematical calculations in this regard are not necessary.

The showing in the drawings of the container 11 is diagrammatic in nature. It will be understood that the upper part above filter 14 may be detachable from the lower part, and that the filter 14 may be removably held in place between the upper and lower sections of the container in any suitable manner. The lower section of the container need not be conical although this configuration has certain advantages as heretofore described.

While the invention has particular advantages in the separation of fine particles of size 0.5 micron to 50 microns, the invention in its broadest aspects could be used for sieve meshes having apertures as large as 300 microns.

Fluids such as air and kerosene may also be used to operate this device.

It will be apparent that many modifications and variations may be effected without departing from the scope of the novel concepts of the present invention.

I claim as my invention:

1. The method of separating particles of below a predetermined size from particles larger than said predetermined size which comprises suspending a mixture of such particles in a fluid stream,
passing said stream to a separation zone at a mass flow
velocity sufficient to cause at least partial elutriation
of the particles in said stream during such passage, subjecting the stream in said separation zone to conditions of turbulent flow to thereby break up particle agglomerates, passing the stream in said separation zone upwardly through a filter having openings therein of said predetermined size, increasing the mass flow velocity of said stream until the smaller particles pass through said filter, reducing the mass flow velocity of said stream when the passage of particles through said filter substantially diminishes, and recovering said smaller particles.

2. The method of claim 1 which includes the step of inverting said separation zone after the separation of smaller particles takes place to thereby collect the larger particles on said filter.

3. Apparatus suitable for the elutriation and fractionation of particles of from 0.5 to 300 microns diameter from an agglomerate comprising a predispersion unit for holding and dispersing an agglomerate prior to fractionation, said predispersion unit having an inlet and an outlet for fluid flow, a chamber for elutriation and fractionation of particles connected to the outlet of said predispersion unit, said chamber having an inlet port and an outlet port, said inlet port being located at the bottom of said chamber and communicating with the outlet of said predispersion unit, said chamber further having filter means of predetermined pore size located above said inlet port, said filter means separating said inlet port from said outlet port whereby particles below the predetermined pore size will be passed to said outlet port, means communicating with said outlet port for collecting particles which pass through said filter means.

4. Apparatus as defined in claim 3 wherein said chamber between said inlet port and said filter means is of varying diameter whereby turbulent flow is readily induced.

5. Apparatus as defined in claim 3 wherein said chamber below said filter means is in the shape of a cone and said inlet port is located at the apex of said cone.

References Cited

UNITED STATES PATENTS

| | | | |
|---|---|---|---|
| 99,002 | 1/1870 | Ritter et al. | 210—302 |
| 145,441 | 12/1873 | Minot | 209—160 |
| 281,336 | 7/1883 | Blackmer | 210—302 |
| 1,667,783 | 5/1928 | Harkort | 209—160 |
| 1,917,156 | 7/1933 | Rauschenbusch et al. | 209—160 X |
| 2,683,685 | 7/1954 | Matheson | 209—141 X |
| 3,087,482 | 4/1963 | Haller | 209—13 X |

FOREIGN PATENTS

| | | |
|---|---|---|
| 533,869 | 3/1922 | France. |

HARRY B. THORNTON, *Primary Examiner.*

TIM R. MILES, *Assistant Examiner.*